Patented Oct. 27, 1936

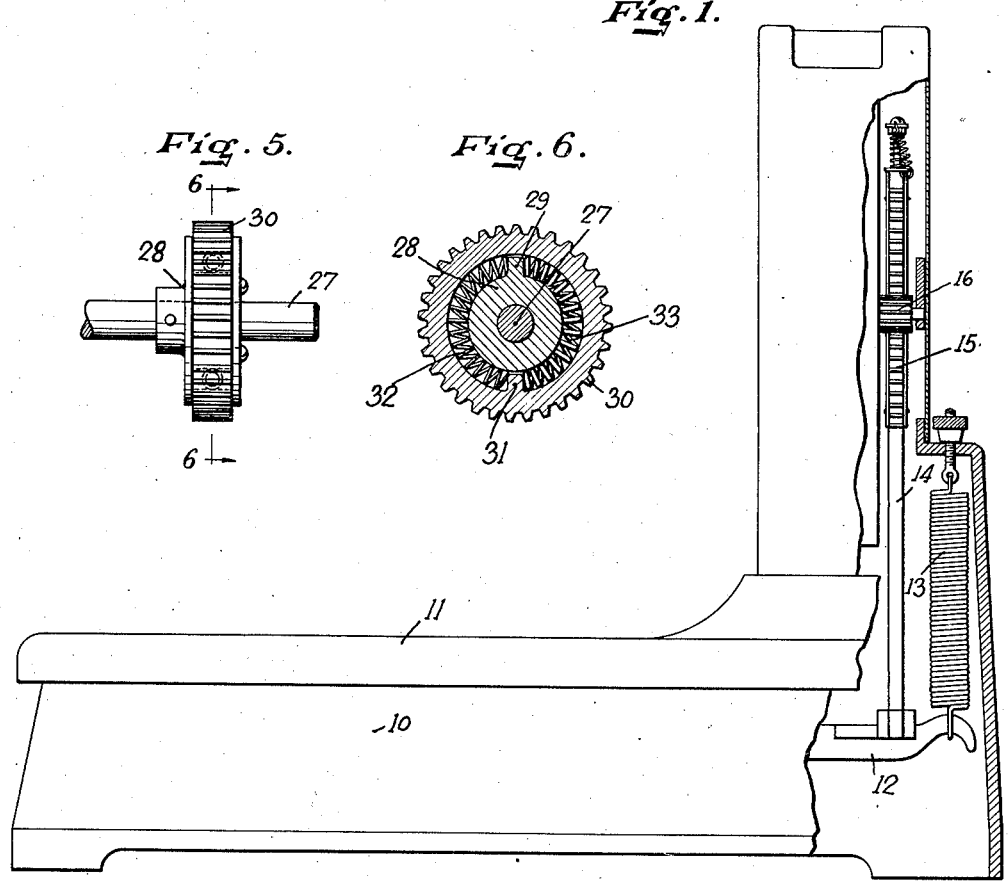

2,058,431

UNITED STATES PATENT OFFICE 2,058,431

RACK BAR AND PINION

Hermann Eschenbacher, Ridgewood, N. Y., assignor to The Jacobs Bros. Co. Inc., Brooklyn, N. Y., a corporation of New York Application March 28, 1934, Serial No. 717,754

7 Claims. (Cl. 74—422)

This invention relates to a structurally and functionally improved pinion or rack mechanism capable of use in numerous different associations, but primarily intended for employment in connection with scales.

It is a well appreciated fact that considerable difficulty has been encountered in using scales where loads were suddenly thrust upon or removed from the platform or other weight receiving member of the scale. More especially, the sudden movement transmitted to the mechanism has frequently resulted in the rack stripping the pinion or in the rack jumping one or more of the teeth of the pinion. In the former case the usefulness of the scale has been destroyed, and it is necessary to rebuild and renew one or more parts of the same in order to again have an operative mechanism. In the latter case it has been necessary to disassemble and readjust the parts to again have the scale operative.

With this in mind attempts have been made to overcome the difficulty, but these attempts, where even partially conducive of the desired results, have been more than offset by the increasing complication of the substituted form of mechanism. Quite aside from the factor of increased expense in manufacturing assembly, this mechanism has resulted in a problem in the scale registering mechanism in that delicacy of balance and proper operation of the parts at this point is essential if accurate results are to obtain. Moreover, if the substituted mechanism involved a structure such that maladjustment was liable to result, inaccuracy of registration would inevitably follow in an exaggerated manner, due to the fact that the mechanism had to be arranged at the very point where utmost precision was required.

With the foregoing in mind, it is an object of the invention to provide a simple structure in which no rearrangement or modification of the essential scale mechanism will be necessary. In other words, mechanism constructed in accordance with the teachings of the present invention may readily be substituted for the old form of rack and/or pinion structure. This substitution will safeguard the scale against any damage even if loads are suddenly imposed upon or removed from the platform or its equivalent.

A further object of the invention is that of providing a mechanism of this nature which may be applied and removed by a relatively unskilled operator, and which, when so applied, will have a virtually indefinite period of life without it being necessary to adjust or reconstruct the parts.

An additional object is that of furnishing a rack and/or pinion mechanism which may readily be manufactured in large quantities, and may also be readily assembled so that units are provided which may be sold for relatively nominal amounts.

With these and further objects in mind, reference is had to the attached sheet of drawings illustrating one practical embodiment of the invention, and in which—

Fig. 1 is a partly sectional side view of a scale showing a rack and pinion mechanism in association therewith;

Fig. 2 is a side elevation of the rack with certain parts of the unit broken away to disclose the underlying mechanism;

Fig. 3 is an edge view of this member;

Fig. 4 is a transverse sectional view taken along the lines 4—4 and in the direction of the arrows, as indicated in Fig. 2;

Fig. 5 is an edge view of one form of pinion, which may be constructed in accordance with the teachings of the present invention; and Fig. 6 is a transverse sectional view taken along the lines 6—6 and in the direction of the arrows as indicated in Fig. 5.

Referring primarily to Fig. 1, it will be noted that there has been shown one form of scale, and this showing is merely for the purpose of illustration. It is obvious—as will hereinafter appear—that the teachings of the present invention might be included in connection with any form of weighing mechanism utilizing a rack and pinion.

Thus, the numeral 10 indicates a scale base, above which a platform 11 is positioned, the platform being supported by any desirable association of beams from which an actuating member 12 extends. Depression of the platform may be resisted by, for example, a spring structure 13, and a rack operating member 14 is coupled to the extension 12 of the beam and mounts at its upper end a rack 15, the teeth of which mesh with a pinion 16.

Now referring to Figs. 2 to 4, in which one form of rack structure has been illustrated, it will be noted that this structure preferably includes a bar 17 which is non-circular in cross-section and is mounted to slide within a casing 18, U-shaped in cross-section. The bar is of such a length that its ends preferably extend beyond the casing, and the casing is of a depth greater than that of the bar, so that its edges in turn extend above the same. Positioned between these extending edges is a rack bar 19 which is firmly affixed with respect to the casing, as for example by means of pins 20. The lower end of the rod 17 may terminate in a suitable portion 21 capable of being readily coupled to the bar 14. At its opposite end the rod mounts a washer 22 which is of an area such that it may not be disposed within the space defined by the shell or casing 18. This washer is mounted for sliding movement upon a pin 23 affixed to the bar, and a spring 24 is interposed between the end of the pin 23 and the washer so as to cause the latter to normally bear against the end of the rod. The pin 24 may also mount, by an extension 25 or otherwise, one end of a spring 26, the opposite end of which is secured to the casing or shell 18.

Incident to this construction it will be understood that the casing or shell 18 normally has its end edges in intimate contact with the inner face of the washer 22, or any equivalent element provided at this point. This occurs, due to the spring 26. Likewise the washer is normally maintained in intimate contact with the end of the rod by the spring 24. The latter offers far greater resistance to movement than does the spring 26. Consequently, in effect the casing or shell 18, together with the rack bar coupled thereto, is rigid with the rod 17, and due to the fact that spring 26 preferably lies at an angle with respect to the axis of the rod, the base of the shell or casing will be drawn constantly into contact with the adjacent face of the rod.

If now a rack of this construction is coupled to the scale mechanism and substituted for the ordinary rack bar, it will be found that the parts will operate in a quite usual and conventional manner. However, if a load is suddenly thrust upon the platform, resulting in an abrupt movement of the actuating element 14, the spring 24 will yield incident to the inertia and consequent resistance offered to movement by the pinion and its associated parts, and the downward movement of the rod 17 will be transmitted in a cushioned manner by the shell 18 and the rack bar associated therewith. Thus, the likelihood of damage will be minimized to the greatest extent. Conversely, if the load is suddenly removed from the platform or other load receiving member, the rod 17 will be abruptly raised, but again due to the inertia of the pinion and its associated parts, resistance will be offered to upward movement on the part of the rack bar and the shell mounting the same. In this case these elements will simply move down along the rod 17 and against the resistance of the spring 26. In other words, a lag will be provided which will be overcome by the relatively gradual reestablishment of the pinion and associated parts and by which time the spring 26 will, of course, have returned the shell and rack bar to the normal position as shown in the figures under consideration. In this manner a rack bar is provided which, in effect, is a floating mechanism. However, due to the inequality of the springs, no fear need be felt that inaccuracy of registration will result.

If it is desired to also employ a "floating" type of pinion, which in fact may be utilized in substitution for the structure just described, this may readily be achieved by securing to the shaft 27, mounting the pinion, a hub 28, which may be furnished with a shoulder 29. Concentrically disposed with reference to this hub is the pinion proper, indicated at 30, and this pinion carries a shoulder or inwardly extending abutment 31, preferably disposed within a position which is normally diametrically opposite to the shoulder 29. Interposed between these two shoulders are springs 32 and 33, respectively. The value of one of these springs should be greater than the resistance to movement offered by the other, and in this manner there will be no danger of inaccuracy. However, if a sudden downward thrust occurs, and this thrust is sufficiently abrupt to cause the possibility of damage to the parts, then the pinion will lag behind the rotation of the shaft 27, it being additionally obvious that if a sudden upward movement occurs, a lag will again result incident to the provision of the second spring in this unit.

Thus, among others, the several objects of the invention as specifically afore brought out, are achieved. It will be understood that numerous changes in construction and rearrangement of the parts might be resorted to without departing from the spirit of the invention as defined by the claims. For example, the pinion may be utilized independently of the rack and the rack independently of the pinion, although, of course, best results obtain if both elements are employed, one in association with the other. If such a combination occurs, then in certain respects it is desirable that the weaker spring of the pinion be arranged to resist sudden downward movement of the rack while the stiffer spring of the rack provides the lag for such downward movement, it being understood that the stiffer spring of the pinion will provide the lag for the upper movement, while the weaker spring of the rack acts in this connection. Also where these elements are utilized separately, it is, in certain respects, quite immaterial if they be reversed, so that the weaker springs act during projection and the stiffer springs during retraction of the parts.

Having described my invention, what I claim as new and desire to secure by Letters Patent is:

1. A scale rack including a pair of elements slidably mounted one with respect to the other, a rack member fixedly secured with respect to one of said elements, a spring connected to one of said elements and cooperating with the second of the same to resist relative movements of said elements in one direction, and means for normally maintaining said elements immovable with respect to each other.

2. A scale rack including a pair of elements slidably mounted one with respect to the other, a rack member fixedly secured with respect to one of said elements, a spring connected to one of said elements and cooperating with the second of the same to resist relative movements of said elements in one direction, a second spring extending between said elements and resisting relative movements of the same in an opposite direction, and means whereby said elements are normally maintained immovable with respect to each other.

3. A scale rack including a pair of elements slidably mounted one with respect to the other, a rack member fixedly secured with respect to one of said elements, a spring connected to one of said elements and cooperating with the second of the same to resist relative movements of said elements in one direction, a second spring extending between said elements and resisting relative movements of the same in an opposite direction, one of said springs being stiffer than the other of the same whereby said elements are normally maintained immovable with respect to each other.

4. A scale rack including a pair of elements slidably mounted one with respect to the other, a rack member fixedly secured with respect to one of said elements, a spring connected to one of said elements and cooperating with the second of the same to resist relative movements of said elements in one direction, a second spring extending between said elements and resisting relative movements of the same in an opposite direction, one of said springs being stiffer than the other, and a stop member associated with said stiffer spring and cooperating with said elements normally to maintain the same immovable with respect to each other.

5. A rack including, in combination, a rod, a rack member slidable with respect to said rod, a spring connected to said rack and rod to urge the latter in one direction, and a second spring likewise connected to said rack and rod and tending to urge the latter in an opposite direction.

6. A rack including a rod and rack slidable with respect and connected to each other, a spring cooperating with one end of said rod and with said rack for normally urging said rack and rod to shift longitudinally with respect to each other, and a second spring offering less resistance to movement than said first spring and likewise connected to said rack and rod to urge the same longitudinally with respect to each other and in a direction opposite to that in which said elements are urged by the first spring.

7. A rack including a shell, a rack member mounted by and extending beyond said shell, a rod slidably mounted by said shell, a spring-projected stop element cooperating with said shell and rod to urge the same in opposite directions, and a second spring connected between said shell and rod for urging the same in directions opposite from said first-named spring.

HERMANN ESCHENBACHER.